(12) United States Patent
Huang

(10) Patent No.: US 6,614,908 B1
(45) Date of Patent: Sep. 2, 2003

(54) ADJUSTABLE APPARATUS HOLDER

(76) Inventor: David Huang, No. 279, Fu-Jiann Rd., Tai-Dong City (TW)

( * ) Notice: Subject to any disclaimer, the term of this patent is extended or adjusted under 35 U.S.C. 154(b) by 0 days.

(21) Appl. No.: 10/286,068

(22) Filed: Oct. 31, 2002

(51) Int. Cl.[7] ................................................ H04M 1/00
(52) U.S. Cl. ............. 379/446; 248/231.21; 248/229.22; 248/292.12; 379/454
(58) Field of Search ................................. 248/689, 682, 248/222.13, 229.23, 229.22, 231.21, 231.51, 231.41, 292.12; 379/446, 454, 455

(56) References Cited

U.S. PATENT DOCUMENTS

| | | | | |
|---|---|---|---|---|
| 5,457,745 A | * | 10/1995 | Wang | 379/454 |
| 5,555,302 A | * | 9/1996 | Wang | 379/446 |
| 5,694,468 A | * | 12/1997 | Hsu | 379/446 |
| 5,836,563 A | * | 11/1998 | Hsin-Yung | 248/316.4 |
| 5,903,645 A | * | 5/1999 | Tsang | 379/455 |
| D426,235 S | * | 6/2000 | Phirippidis et al. | D14/253 |
| 6,164,611 A | * | 12/2000 | Kuhnke | 248/279.1 |

* cited by examiner

Primary Examiner—Korie Chan
Assistant Examiner—Steven Marsh
(74) Attorney, Agent, or Firm—Law Offices of David Pai; Chao-Chang David Pai

(57) ABSTRACT

An adjustable apparatus holder used in a carrier and adapted to hold a personal electronic apparatus is disclosed to include a base panel, a first side plate slidably coupled to the base panel at one side, a second side plate pivoted to the base panel at an opposite side and held in a vertical position by springs, and a locking mechanism, which locks the first side plate when the second side plate is maintained in the vertical position, or unlocks the first side plate when the user tilts the second side plate.

2 Claims, 4 Drawing Sheets

ADJUSTABLE APPARATUS HOLDER

BACKGROUND OF THE INVENTION

1. Field of the Invention

The present invention relates to an apparatus holder adapted for use in a carrier to hold a personal electronic apparatus or the like and more particularly to an adjustable apparatus holder that can be adjusted according to the size of the apparatus to be held.

2. Description of the Related Art

Following fast development of high technology, a variety of personal electronic apparatus, such as PAD, pocket computer, mobile telephone, etc., have been developed. A variety of carriers are commercially available for carrying a personal electronic apparatus. However, commercially available carriers for this purpose are designed for holding a particular apparatus or a particular module of an apparatus. A consumer may have to prepare several carriers for different personal electronic apparatus.

BRIEF SUMMARY OF THE INVENTION

The present invention has been accomplished under the circumstances in view. It is the object of the present invention to provide an adjustable apparatus holder, which fits different personal electronic apparatus. To achieve this and other objects of the present invention, the adjustable apparatus holder comprises a base panel, a first side plate, a second side plate, and a locking mechanism. The base panel comprises a first surface, a second surface opposite to the first surface, a bottom receiving space defined by the first surface between a flat raised middle part and two relatively lower side parts of the base panel, a plurality of mounting holes extended through the first surface and the second surface and symmetrically disposed at two sides for mounting, a plurality of first short cylindrical protruded portions and a plurality of second short cylindrical protruded portions perpendicularly downwardly projected from the first surface and suspended in the bottom receiving space, a first side, and a second side disposed in parallel to the first side. The first side plate is an angled side plate comprising a horizontal wall inserted into the bottom receiving space of the base panel, and a vertical wall extended from one side of the horizontal wall at right angles and disposed corresponding to the first side of the base panel, the horizontal wall having two elongated sliding slots bilaterally arranged in parallel and respectively coupled to the first short cylindrical protruded portions of the base panel for enabling the first side plate to be moved relative to the base panel in two reverse directions apart from and toward the first side of the base panel, a middle opening extended to one side thereof away from the vertical wall, and two engagement portions arranged in parallel at two sides of the middle opening. The second side plate comprises a plate body disposed adjacent to the second side of the base panel and facing the vertical wall of the first side plate, a barrel integrated with a bottom side of the plate body, a pivot pivoting the barrel to the second side of the base panel, a male connecting member perpendicularly extended from the periphery of the barrel in the direction opposite to the plate body, and two torsional springs respectively sleeved onto the pivot to support the plate body of the second side plate in a vertical position, the torsional springs each having two opposite ends respectively stopped at the plate body and the base panel. The locking mechanism is provided in the middle opening of the first side plate within the bottom receiving space of the base panel and adapted to lock the first side plate. It comprises a link and two engagement blocks. The link comprises a female connecting member disposed at one end thereof and fastened to the male connecting member of the second side plate, and two side openings disposed at two sides near an opposite end thereof for receiving the engagement blocks. Each of the engagement blocks comprises an engagement portion adapted to engage the engagement portions of the first side plate respectively, a plurality of oblique sliding slots respectively coupled to the second short cylindrical protruded portions of the base panel. The engagement blocks are bilaterally moved within the side openings of the link to disengage the engagement portions of the engagement blocks from the engagement portions of the first side plate when the second side plate is turned outwards from the base panel about the pivot. The torsional springs return the plate body of the second side plate to the vertical position when the user releases the second side plate, thereby causing the link to be returned to force the engagement blocks into engagement with the engagement portions of the first side plate again.

DETAILED DESCRIPTION OF THE PREFERRED EMBODIMENT

Figure 1:
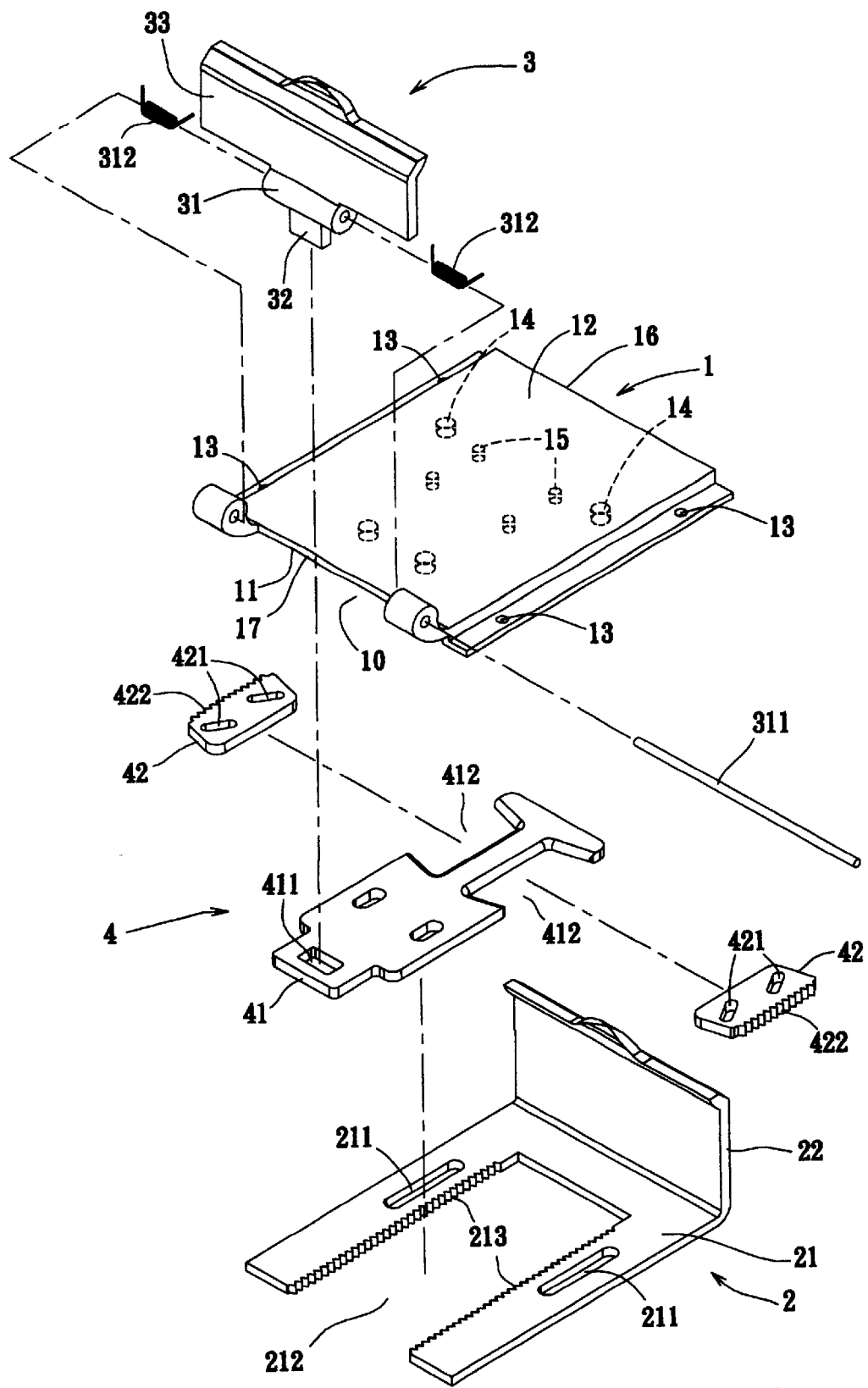
FIG. 1 is an exploded view of an adjustable apparatus holder according to the present invention.
Figure 2:
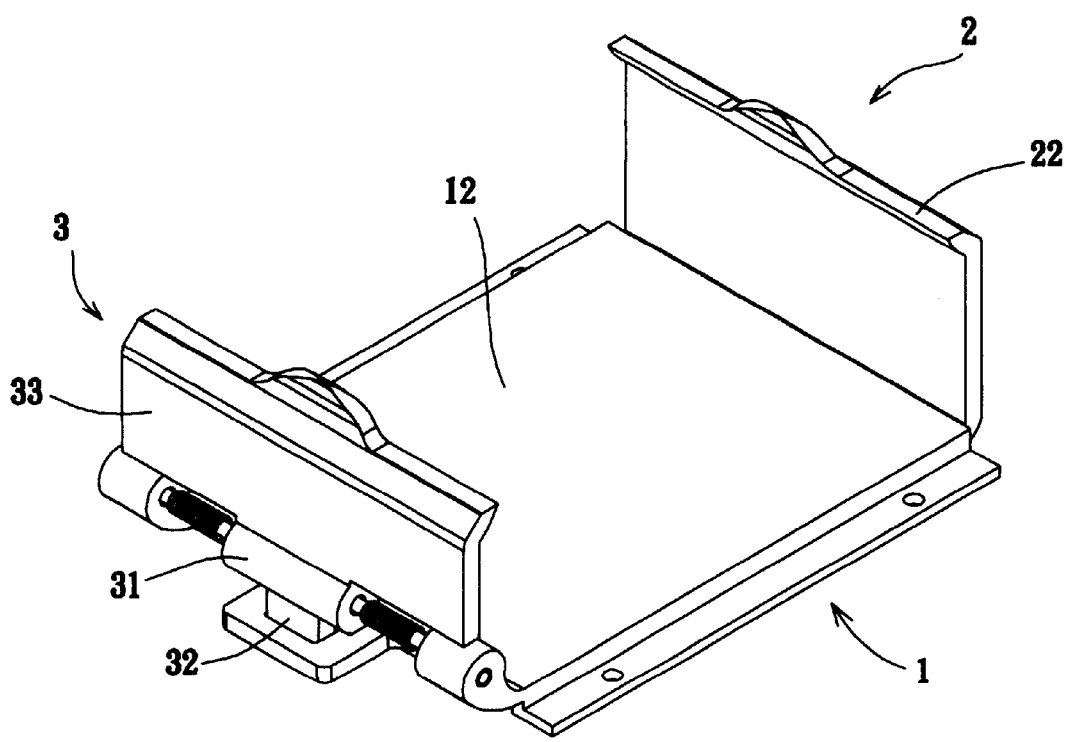
FIG. 2 is an elevational assembly view of the adjustable apparatus holder according to the present invention.

Referring to FIGS. 1 and 2, an adjustable apparatus holder is used in a carrier, for example, a tough leather pocket (not shown), and adapted to hold an apparatus (PDA, pocket computer, mobile telephone, or any of a variety of personal electronic apparatus, not shown). The adjustable apparatus holder comprises a flat base panel 1, a first side plate 2, a second side plate 3, and a locking mechanism 4.

The base panel 1 comprises a first (bottom) surface 11, a second (top) surface 12 opposite to the first (bottom) surface 11, a bottom receiving space 10 defined by the first (bottom) surface 11 between the flat raised middle part and two relatively lower side parts of the base panel 1, a plurality of mounting holes 13 extended through the first (bottom) surface 11 and the second (top) surface 12 and symmetrically disposed at two sides for mounting, a plurality of first short cylindrical protruded portions 14 and a plurality of second short cylindrical protruded portions 15 perpendicularly downwardly projected from the first (bottom) surface 11 and suspended in the bottom receiving space 10, a first side 16, and a second side 17 disposed in parallel to the first side 16. Through the mounting holes 13, the base panel 1 can be fixedly secured to a carrier (not shown) by fastening elements, for example, screws. The direction passing across the first side 16 and the second side 17 is defined as the extension direction of the adjustable apparatus holder.

The first side plate 2 is an angled plate comprising a horizontal wall 21 inserted into the bottom receiving space 10 of the base panel 1, and a vertical wall 22 extended from one side of the horizontal wall 21 at right angles and disposed corresponding to the first side 16 of the base panel 1. The horizontal wall 21 has two elongated sliding slots 211 bilaterally arranged in parallel and respectively coupled to the first short cylindrical protruded portions 14 of the base panel 1 for enabling the first side plate 2 to be moved relative to the base panel 1 in the aforesaid extension direction, a middle opening 212 extended to one side thereof away from the vertical wall 22, and two serrated engagement portions 213 arranged in parallel at two sides of the middle opening 212 and extended in the aforesaid extension direction.

The second side plate 3 comprises a plate body 33, a barrel 31 integrated with the bottom side of the plate body 33, and a male connecting member, for example, a bottom plug rod 32 perpendicularly extended from the periphery of the barrel 31 in the direction opposite to the plate body 33. A pivot 311 pivots the barrel 31 to the second side 17 of the base panel 1 by a pivot 311. Two torsional springs 312 are sleeved onto the pivot 311, each having two opposite ends respectively stopped at the plate body 33 and the base panel 1 to hold the second side plate 3 in a vertical position substantially in parallel to the vertical wall 22 of the first side plate 2.

The locking mechanism 4 is provided in the middle opening 212 of the first side plate 2 within the bottom receiving space 10 of the base panel 1. The locking mechanism 4 comprises a link 41 and two engagement blocks 42. The link 41 comprises a female connecting member, for example, a plughole 411 disposed in one end (namely, the front end) and fastened to the male connecting member (the bottom plug rod) 32 of the second side plate 3, and two side openings 412 disposed at two sides near the other end (namely, the rear end) for receiving the engagement blocks 42. Each of the engagement blocks 42 comprises a plurality of oblique sliding slots 421 respectively coupled to the second short cylindrical protruded portions 15 of the base panel 1, and a serrated engagement portion 422 adapted to engage the serrated engagement portions 213 of the first side plate 2 respectively. The oblique sliding slots 421 extend obliquely at an angle relative to the extension direction of the adjustable apparatus holder.

Figure 3:
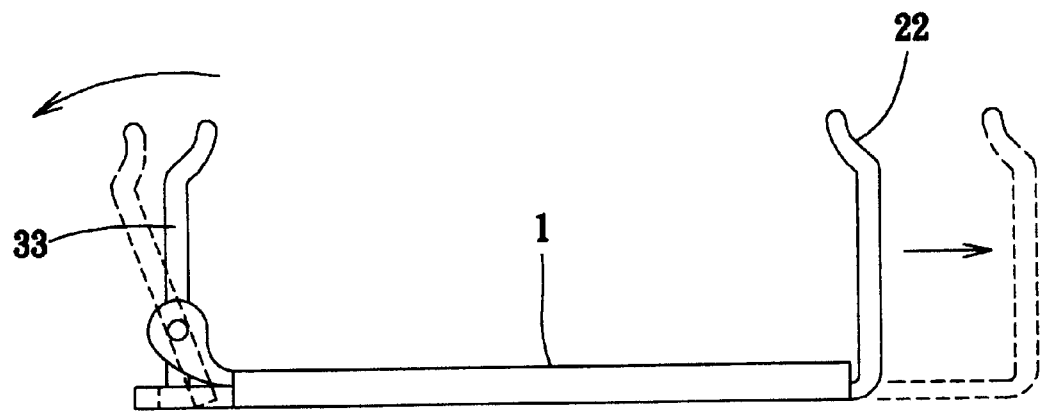
FIG. 3 is a schematic drawing showing the adjustable apparatus holder of the present invention adjusted.
Figure 4:
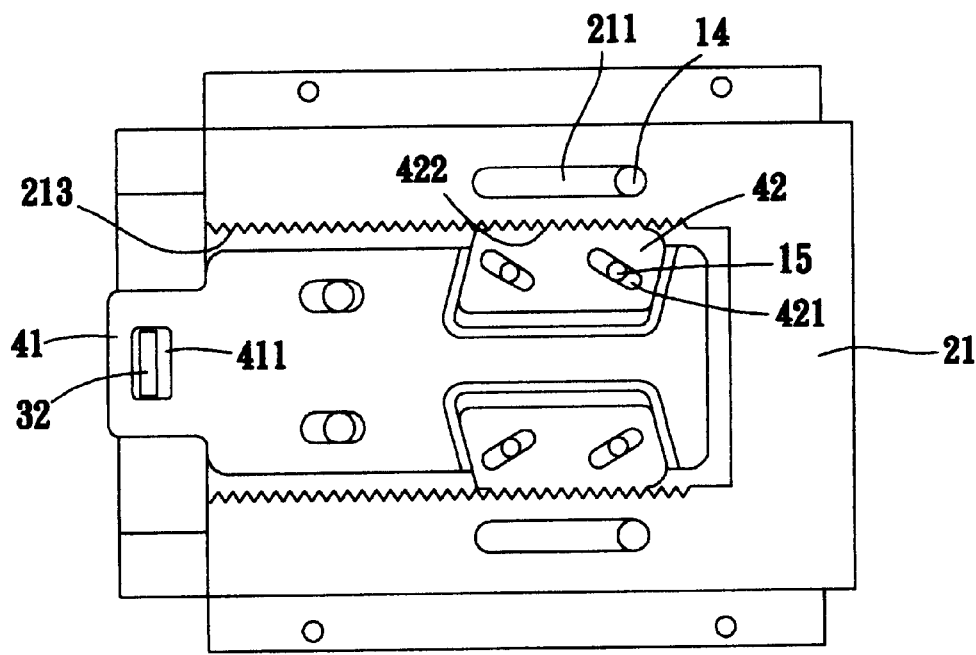
FIG. 4 is a top plain view of the adjustable apparatus holder according to the present invention.

Referring to FIGS. 3 and 4, after installation of the adjustable apparatus holder in a carrier (not shown), the second (top) surface 12 of the base panel 1, the vertical wall 22 of the first side plate 2 and the plate body 33 of the second side plate 3 can hold an electronic apparatus firmly in the carrier. When the plate body 33 of the second side plate 3 is kept in the vertical position (perpendicular to the base panel 1), the engagement blocks 42 are respectively bilaterally forced outwards from the link 41, keeping the serrated engagement portions 422 of the engagement blocks 42 in engagement with the serrated engagement portions 213 of the first side plate 2, and therefore the first side plate 2 is locked, i.e., the distance between the vertical wall 22 of the first side plate 2 and the plate body 33 of the second side plate 3 is fixed.

Figure 5:
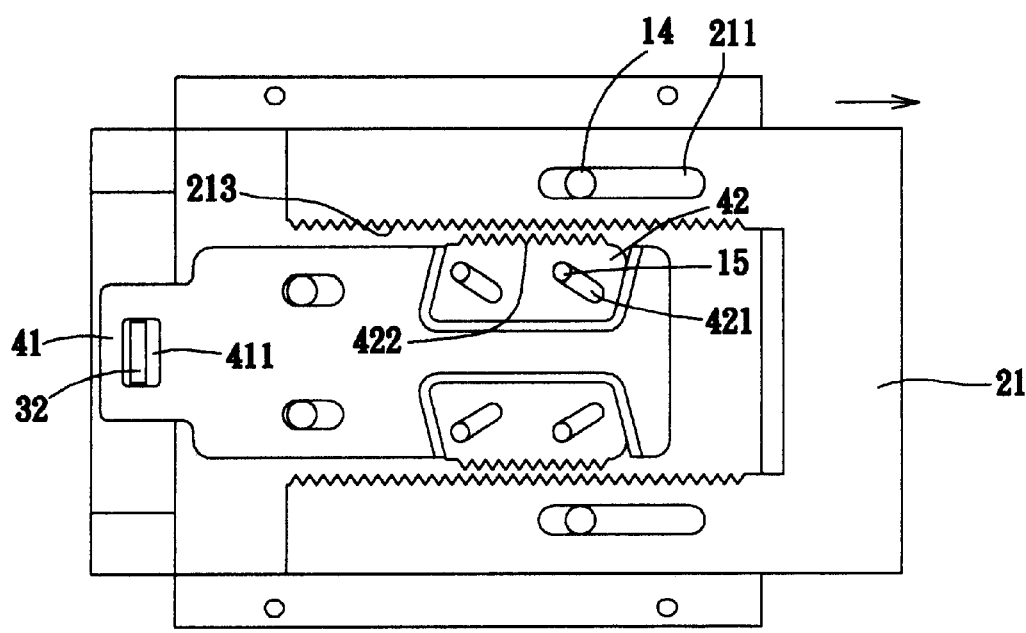
FIG. 5 is similar to FIG. 4 but showing the adjustable apparatus holder adjusted.

Referring to FIG. 5 and FIG. 3 again, when the plate body 33 of the second side plate 3 is tilted from the second side 17 of the base panel 1, the bottom plug rod 32 of the second side plate 3 pushes the link 41 backwards (in the direction from the second side 17 of the base panel 1 toward the first side 16 thereof), thereby causing the engagement blocks 42 to be respectively received within the side openings 412 to disengage the serrated engagement portions 422 from the serrated engagement portions 213 of the first side plate 2, for enabling the first side plate 2 to be moved relative to the base plate 1 to adjust the pitch between the vertical wall 22 of the first side plate 2 and the plate body 33 of the second side plate 3 according to the size of the electronic apparatus to be held. After loading of the electronic apparatus, the second side plate 3 is released from the hand, and the torsional springs 312 pull the second side plate 3 back to its former vertical position, and therefore the engagement blocks 42 are returned into engagement with the serrated engagement portions 213 of the first side plate 2 again.

A prototype of adjustable apparatus holder has been constructed with the features of FIGS. 1~5. The adjustable apparatus holder functions smoothly to provide all of the features discussed earlier.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. An adjustable apparatus holder installed in a carrier and adapted to hold a personal apparatus, comprising:

a base panel comprising a first surface, a second surface opposite to said first surface, a bottom receiving space defined by said first surface between a flat raised middle part and two relatively lower side parts of said base panel, a plurality of mounting holes extended through said first surface and said second surface and symmetrically disposed at two sides for mounting, a plurality of first short cylindrical protruded portions and a plurality of second short cylindrical protruded portions perpendicularly downwardly projected from said first surface and suspended in said bottom receiving space, a first side, and a second side disposed in parallel to said first side;

an angled first side plate comprising a horizontal wall inserted into said bottom receiving space of said base panel, and a vertical wall extended from one side of said horizontal wall at right angles and disposed corresponding to the first side of said base panel, said horizontal wall having two elongated sliding slots bilaterally arranged in parallel and respectively coupled to said first short cylindrical protruded portions of said base panel for enabling said first side plate to be moved relative to said base panel in two reverse directions apart from and toward the first side of said base panel, a middle opening extended to one side thereof away from said vertical wall, and two engagement portions arranged in parallel at two sides of said middle opening;

a second side plate comprising a plate body disposed adjacent to the second side of said base panel and facing the vertical wall of said first side plate, a barrel integrated with a bottom side of said plate body, a pivot pivoting said barrel to the second side of said base panel, a male connecting member perpendicularly extended from the periphery of said barrel in the direction opposite to said plate body, and two torsional springs respectively sleeved onto said pivot to support said plate body of said second side plate in a vertical position, said torsional springs each having two opposite ends respectively stopped at said plate body and said base panel; and a locking mechanism provided in the middle opening of said first side plate within the bottom receiving space of said base panel and adapted to lock said first side plate, said locking mechanism being comprised of a link and two engagement blocks, said link comprising a female connecting member disposed at one end thereof and fastened to the male connecting member of said second side plate, and two side openings disposed at two sides near an opposite end thereof for receiving said engagement blocks, said engagement blocks each comprising an engagement portion adapted to engage the engagement portions of said first side plate respectively, a plurality of oblique sliding slots respectively coupled to said second short cylindrical protruded portions of said base panel such that said engagement, blocks are bilaterally moved within the side openings of said link to disengage the engagement portions of said engagement blocks from the engagement portions of said first side plate when said second side plate is turned outwards from said base panel about said pivot, and said torsional springs return said plate body of said second side plate to said vertical position when the user releases said second side plate, thereby causing said link to be returned to force said engagement blocks into engagement with the engagement portions of said first side plate again.

2. The adjustable apparatus holder as claimed in claim 1, wherein the engagement portion of each of said engagement blocks is a serrated engagement portion extended along one side of the respective engagement block, and the engagement portions of said first side plates are serrated engagement portions arranged in parallel and extended in the moving direction of said first side plate.

* * * * *